US010368697B2

(12) United States Patent
Sorensen et al.

(10) Patent No.: US 10,368,697 B2
(45) Date of Patent: Aug. 6, 2019

(54) EGG CRACKER, EGG SEPARATOR AND/OR EGG MIXER

(71) Applicant: RUNWAY BLUE, LLC, Lehi, UT (US)

(72) Inventors: Steven M. Sorensen, Alpine, UT (US); David O. Meyers, East Layton, UT (US); Kim L. Sorensen, Alpine, UT (US)

(73) Assignee: Runway Blue, LLC, Alpine, UT (US)

( * ) Notice: Subject to any disclaimer, the term of this patent is extended or adjusted under 35 U.S.C. 154(b) by 329 days.

(21) Appl. No.: 14/796,896

(22) Filed: Jul. 10, 2015

(65) Prior Publication Data

US 2017/0007076 A1   Jan. 12, 2017

(51) Int. Cl.
A47J 43/14   (2006.01)
A01K 43/00   (2006.01)
A47J 37/10   (2006.01)
A23J 1/09    (2006.01)

(52) U.S. Cl.
CPC ..................... *A47J 43/14* (2013.01)

(58) Field of Classification Search
CPC . A47J 43/14; A47J 37/10; A01K 43/00; A23J 1/09
USPC .......................................................... 99/498
See application file for complete search history.

(56) References Cited

U.S. PATENT DOCUMENTS

| | | | |
|---|---|---|---|
| 1,327,929 A * | 1/1920 | Tripke ................. | A47J 19/022 99/499 |
| 2,018,162 A | 10/1935 | Weldon | |
| 2,117,899 A | 5/1938 | Meckler | |
| 2,720,232 A * | 10/1955 | Denton ................. | A47J 43/14 99/498 |
| 2,212,328 A | 8/1960 | Scurlock | |
| 3,494,397 A * | 2/1970 | Sparks ................. | A47J 43/14 30/120.1 |
| 3,857,327 A | 12/1974 | Popeil | |
| 4,463,666 A | 8/1984 | Papp | |
| 5,438,919 A | 8/1995 | Idowu | |
| 5,784,953 A * | 7/1998 | Wang .................... | A47J 43/14 99/497 |

(Continued)

FOREIGN PATENT DOCUMENTS

JP      06327573 A  *  11/1994

OTHER PUBLICATIONS

International Search Report and Written Opinion from PCT/US2016/03144 dated Aug. 5, 2016.

(Continued)

*Primary Examiner* — Ibrahime A Abraham
*Assistant Examiner* — Spencer H. Kirkwood
(74) *Attorney, Agent, or Firm* — Maschoff Brennan; Paul G. Johnson

(57) ABSTRACT

An egg cracker may include a platform with a generally planar upper surface and a protrusion may extend upwardly from the generally planar upper surface of the platform to form an egg cracking structure. The platform may be connected to an annular support ring and connecting members may connect the platform and the annular support ring. The annular support ring may be sized and configured to be disposed within an upper portion of a container and, when a lid is attached to the container, the egg cracker may be enclosed by the container and lid.

27 Claims, 13 Drawing Sheets

(56) References Cited

U.S. PATENT DOCUMENTS

| | | | | |
|---|---|---|---|---|
| 6,303,915 B1 | * | 10/2001 | Young | A23J 1/09 |
| | | | | 219/733 |
| 6,329,004 B1 | * | 12/2001 | Fernandez | A23L 5/15 |
| | | | | 219/726 |
| D636,223 S | | 4/2011 | Neiheiser | |
| 2009/0008390 A1 | * | 1/2009 | Robinson | B65D 51/24 |
| | | | | 220/212 |
| 2013/0062304 A1 | * | 3/2013 | Meyers | B65D 43/00 |
| | | | | 215/240 |

OTHER PUBLICATIONS

International Search Report and Written Opinion dated Aug. 5, 2016, as received in Application No. PCT/US2016/031044 (14 pages).
U.S. Appl. No. 29/532,896, filed Jul. 10, 2015, Sorensen et al.
Notice of Allowance from U.S. Appl. No. 29/532,896 dated Oct. 3, 2016.
Examiner's Report from Canadian Patent Application No. 165288 dated Feb. 3, 2016.

* cited by examiner

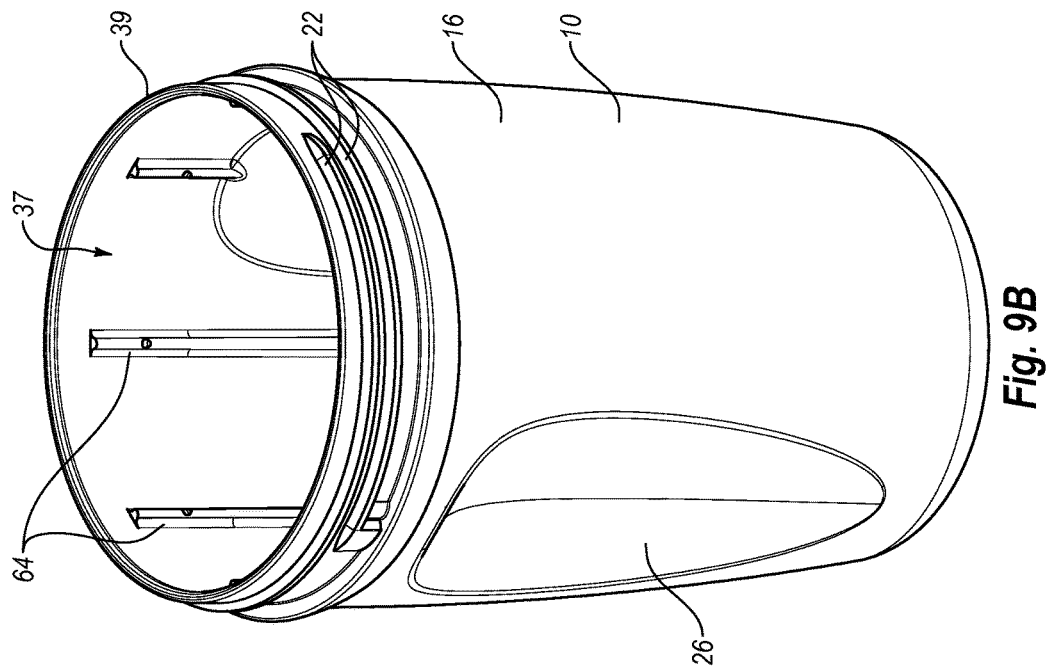
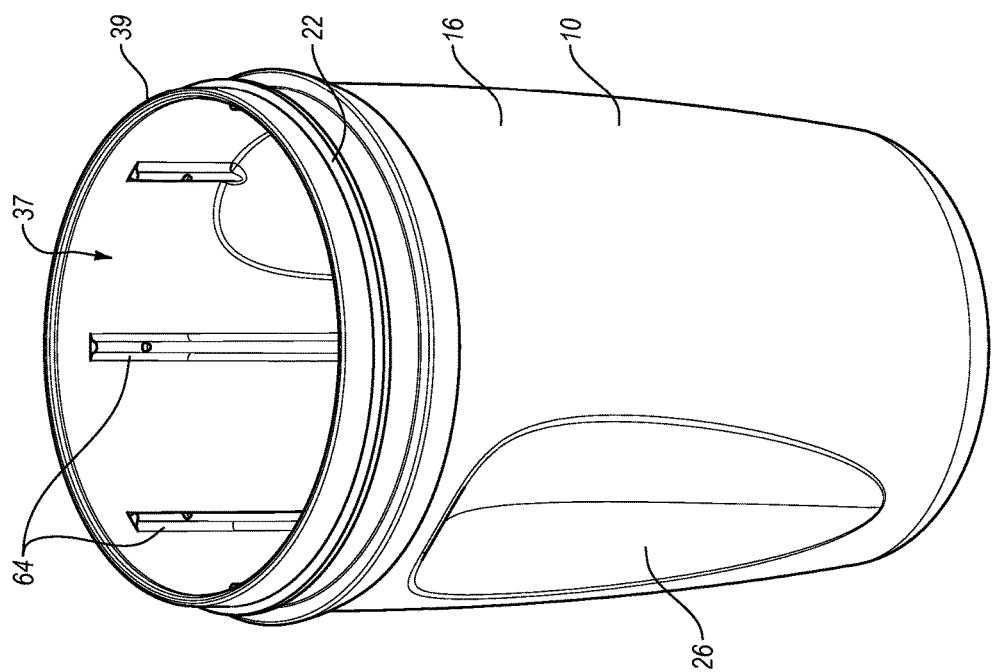

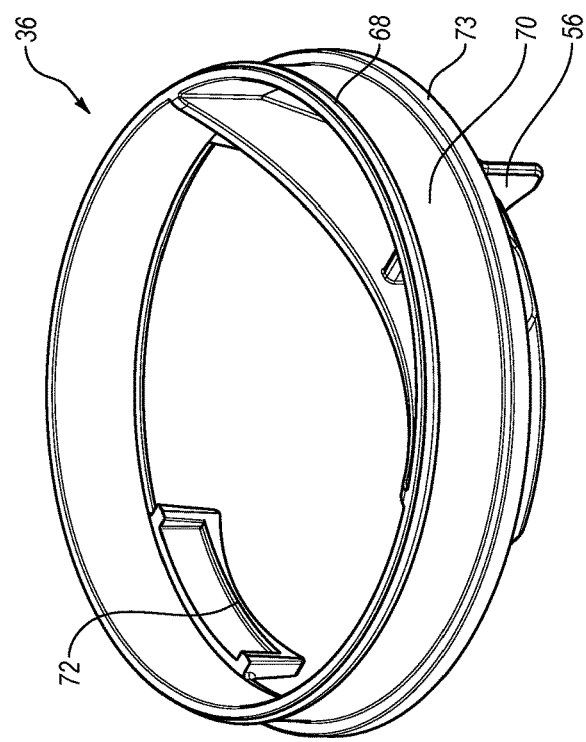
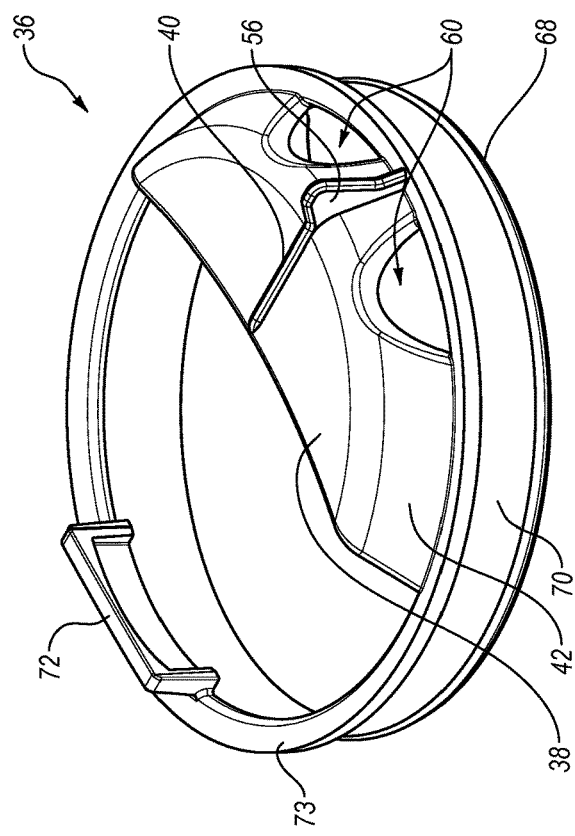

EGG CRACKER, EGG SEPARATOR AND/OR EGG MIXER

BACKGROUND

Field of the Invention

This application is generally directed towards an egg cracker, an egg separator and/or an egg mixer, more specifically, to an egg cracker, an egg separator and/or a container that may facilitate mixing of eggs, which may be used in combination and/or independently.

Description of Related Art

Conventional containers may hold a variety of different types of liquids and fluids. For example, conventional containers may hold powdered drinks, electrolyte pills, energy drinks, baby formulas, pancake batters, crepe mixes, baking materials, dietary supplements, salsa, sauces, oil and vinegar, salad dressings, smoothies, juices, coffee and creamer, medicinal products, non-edible materials, and the like.

These known containers may be used in a wide variety of environments such as at home, office, gym or health club, and while traveling. Known containers may also be used during activities such as exercising, driving a car, or riding in an automobile, bus, train, or airplane.

Conventional containers, however, may be difficult to use in certain situations. For example, it may be difficult to add ingredients to some known containers. In particular, many known containers require the entire lid be removed to add ingredients. Additionally, known containers may include an opening in the lid but the opening may be so small that it is challenging and burdensome to add ingredients through the opening. Thus, even though the container may include an opening in the lid, the entire lid is removed to add ingredients.

Egg crackers are known and conventional egg crackers are typically handheld devices that crack an egg. Known egg crackers often include one or more moving parts such as handles or spring-loaded mechanisms that are used to crack the egg. Disadvantageously, many conventional egg crackers include multiple components, which may make the devices more difficult to manufacture and clean. In addition, while conventional egg crackers may crack the egg, the devices may be relatively difficult and time-consuming to use. For example, some known egg crackers require the egg to be disposed in a particular position and orientation before the device can be used. Thus, users may spend a considerable amount of time before the egg cracker can be used to crack the egg. Further, because some known egg crackers include a number of components and surfaces, users may have to spend a considerable amount of time and effort to clean the egg cracker after use.

BRIEF SUMMARY OF THE INVENTION

A need therefore exists for an egg cracker, an egg separator and/or container that eliminates the above-described disadvantages and problems.

One aspect is a container that may include a body. The container may be sized and configured to hold one or more liquids, fluids, solutions, and the like. For example, the container may be sized and configured to hold water, juices, shakes, protein drinks, meal replacements, batters, dressings, vinaigrettes, and the like. The container may also hold other food stuffs such as fruits, vegetables, etc. The container may include an opening and the opening may provide fluid communication with the body. A lid may be selectively attached to the container, and the lid may seal the opening.

The lid may also include an opening, such as an aperture or spout, and a cover may selectively open or close the opening in the lid.

Another aspect is an egg cracker that may be used in connection with a container. Advantageously, the egg cracker may be disposed within the container. In particular, the egg cracker may fit within the opening or neck of the container. Additionally, the egg cracker may allow the lid to be selectively attached to the container. Specifically, the egg cracker may be disposed in the container and the lid may be selectively connected and removed from the container. Thus, the egg cracker may be disposed inside the container and the egg cracker may not interfere with the operation of the container lid. Further, the egg cracker may be easily inserted and removed from the container. For instance, the egg cracker may fit within the opening of the container and the egg cracker may be held in position by a friction or interference fit. This may allow the egg cracker to be easily inserted and removed from the container.

Still another aspect is an egg cracker that may include a generally flat and/or generally planar surface upon which an egg can be cracked. The egg cracker may include a ridge or protrusion that may facilitate cracking of the egg. For example, the generally flat or planar surface may include an upwardly extending ridge or protrusion. The egg cracker may also include an elongated or larger protrusion, and the elongated protrusion may also be sized and configured for cracking the egg. The elongated protrusion could also be used for other purposes such as puncturing the egg shell, the yoke, or other portion of the egg.

Still yet another aspect is an egg separator, and the egg separator that may be used in connection with the egg cracker. The egg separator may include a receiving portion, such as a concave portion, that is sized and configured to receive the contents of a cracked egg. The egg separator may facilitate separating the egg yolk from the other portions of the egg. In particular, the egg separator may be sized and configured for holding the egg yolk.

Advantageously, the egg separator and egg cracker may be used together. For instance, the egg cracker may be used to crack the egg and then the egg separator may be used to separate the egg. If desired, the egg separator and egg cracker may be selectively or removably connected. The egg separator may also simply contact or rest upon a portion of the egg cracker. For example, the egg cracker may include an opening and a portion of the egg separator may be disposed within the opening. In addition, the egg cracker and egg separator may be complementary or paired components that are intended to work in combination. The egg cracker and egg separator may also be separate or independent components. Significantly, whether used in combination or separately, the egg cracker may be used to crack one or more eggs and the egg separator may be used to separate one or more of the cracked eggs. The egg cracker and egg separator may also be used independently or separately. For example, the egg cracker may be used by itself to crack one or more eggs. The egg separator may also be used independently to separate one or more eggs.

A further aspect is a container that may include a lid, and the lid may be selectively coupled to the body of the container. When the lid is coupled to the body of the container, the egg cracker and the egg separator may be enclosed within the container and lid. The lid may include an opening to allow access to the egg cracker and/or egg separator. Advantageously, the lid may allow the egg cracker and the egg separator to be used while the egg cracker and egg separator are disposed within the container. In addition, the lid may allow the egg cracker and the egg separator to be used in combination or separately. After reviewing this disclosure, one of ordinary skill in the art will appreciate that the egg cracker and/or egg separator may be used with or without the container. One of ordinary skill in the art will also appreciate that the egg cracker and egg separator may be used with containers of different shapes, sizes, configurations and arrangements depending, for example, upon the intended use of the egg cracker, egg separator, or container.

A still further aspect is an egg cracker and/or egg separator that may be selectively disposed within a container. Advantageously, the egg cracker and/or egg separator may be easily inserted and removed from the container. In addition, the egg cracker and egg separator may be independently inserted and/or removed from the container. For example, the egg cracker may be disposed within an opening in the container and the egg separator may be disposed within an opening of the egg cracker. This may allow the egg cracker to be easily inserted and removed from the container, and the egg separator to be easily inserted and removed from the opening in the egg cracker. This may also allow the egg cracker to be used independently or in combination with the container and/or egg separator. If desired, the container, the lid, the egg cracker and/or the egg separator may include one or more alignment members to help align the components. For instance, when the lid is being attached to the container, the lid may include an alignment member and the egg cracker may include a corresponding alignment member. The alignment members may help ensure the lid and egg cracker are aligned. For example, the alignment members may help ensure the opening in the lid and the opening in the egg cracker are aligned. Advantageously, if the openings are aligned, this may facilitate use of the egg cracker and the container.

Another aspect is an egg cracker that may comprise an annular support ring; a platform with a generally planar upper surface; a protrusion extending upwardly from the generally planar upper surface of the platform, the protrusion and the generally planar upper surface forming an egg cracking structure; and one or more connecting members connecting the platform and the annular support ring. The egg cracker may allow an egg to be cracked by impacting the egg with the protrusion and the generally planar upper surface of the platform.

Advantageously, the annular support ring of the egg cracker may be sized and configured to be disposed within a container. The annular support ring may also be sized and configured to at least partially engage an upper portion of the container. In addition, an opening may be disposed adjacent to the platform, and the opening may be sized and configured to selectively receive an egg separator. If desired, the opening may be at least partially defined by an inner surface of the platform and an inner surface of the annular support ring. The egg cracker may further include a lid, and the lid may be selectively attachable to the container. This may allow the egg cracker to be enclosed by the container and the lid when the egg cracker is disposed within the upper portion of the container and the lid is attached to the container. Additionally, the platform may be disposed within a cylinder aligned with an outer perimeter of the annular support ring, and a height of the protrusion may be slightly larger than or equal to an average thickness of an egg shell. Further, the protrusion may be centrally located on the generally planar upper surface of the platform and the protrusion may be generally aligned with an axis aligned with a center of the annular support ring. The upper surface of the platform may be disposed above an upper surface of the annular support ring or the upper surface of the platform may be aligned with or spaced below the upper surface of the annular support ring.

Still another aspect is a system for cracking an egg that may comprise a container; a lid selectively attachable and removable from the container; and an egg cracker sized and configured to be at least partially disposed within the container. The egg cracker may be enclosed by the container and the lid when the lid is attached to the container. In further detail, the egg cracker may comprise an outer support structure that contacts that container and supports the egg cracker within the container, a platform with a generally planar upper surface, a protrusion extending upwardly from the upper surface of the platform, and one or more connecting members that may connect the platform and the outer support structure. The protrusion and the generally planar upper surface may form an egg cracking structure and the egg cracker may be selectively removable from the container. The system may also include an egg separator, which may be selectively disposed within an opening in the egg cracker. The system may further include a mixing device, such as a BLENDER BALL®, available from the Blender Bottle Company, Lehi, Utah, (www.blenderbottle.com), which may be disposed insider the container. The BLENDER BALL® may facilitate mixing of the egg. Thus, advantageously, the system may be used to perform multiple functions, for example, crack an egg, separate the egg, and/or mix the egg.

Still yet another aspect of the system for cracking an egg is the lid for the container that may include an opening, a cover may selectively cover the opening in the lid of the container; and an alignment member may align the opening in the lid with an opening in the egg cracker when the lid is being attached to the container. If desired, the outer support structure of the egg cracker may comprise an annular support ring with an outer diameter that allows at least a portion of the annular support ring to be disposed within an upper portion of the container, and the annular support ring may engage at least a portion of the container to support the egg cracker within the container. In addition, an opening may be at least partially defined by an inner surface of the outer support structure and an inner surface of the platform, and the opening may be sized and configured to allow at least a portion of the contacts of a cracked egg to pass through the opening and into the container. Additionally, a flange may extend outwardly from the outer support structure of the egg cracker, and the flange may be sized and configured to contact an upper surface of the container. Further, the upper surface of the platform may be disposed above an upper surface of the container and an upper surface of the outer support member.

A still further aspect is an apparatus that may include a container, a lid selectively coupled to the container, and an egg cracker selectively disposed within the container. The egg cracker may be enclosed by the container and the lid when the lid is attached to the container and the egg cracker is disposed within the container. The egg cracker may include a platform with a planar surface, a protrusion extending upwardly from the planar surface of the platform, a support structure sized and configured to contact the container, the support structure sized and configured to position and support the egg cracker within the container, and one or more connecting members connecting the platform and the support structure. The apparatus may also include an egg separator and the egg separator may be selectively disposed within an opening in the egg cracker. The egg separator may include a handle that facilitates use of the egg separator, and the egg separator may be enclosed by the container and the lid when the lid is attached to the container and the egg separator is disposed within the opening in the egg cracker. Further, the support structure of the egg cracker may have a ring-shaped configuration that is sized and configured to be disposed within an upper portion of the container.

These and other aspects, features and advantages of the present invention will become more fully apparent from the following brief description of the drawings, the drawings, the detailed description of preferred embodiments and appended claims.

It is to be understood that both the foregoing general description and the following detailed description are given as examples and explanatory and are not restrictive of the invention, as claimed.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limits its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

FIG. 9A is a front perspective view of the container show in FIG. 1;

FIG. 9B is a rear perspective view of the container shown in FIG. 9A;

FIG. 10A is a front perspective view of the egg cracker shown in FIG. 3;

FIG. 10B is a lower perspective view of the egg cracker shown in FIG. 10A;

DETAILED DESCRIPTION OF THE PREFERRED EMBODIMENTS

Figure 1:
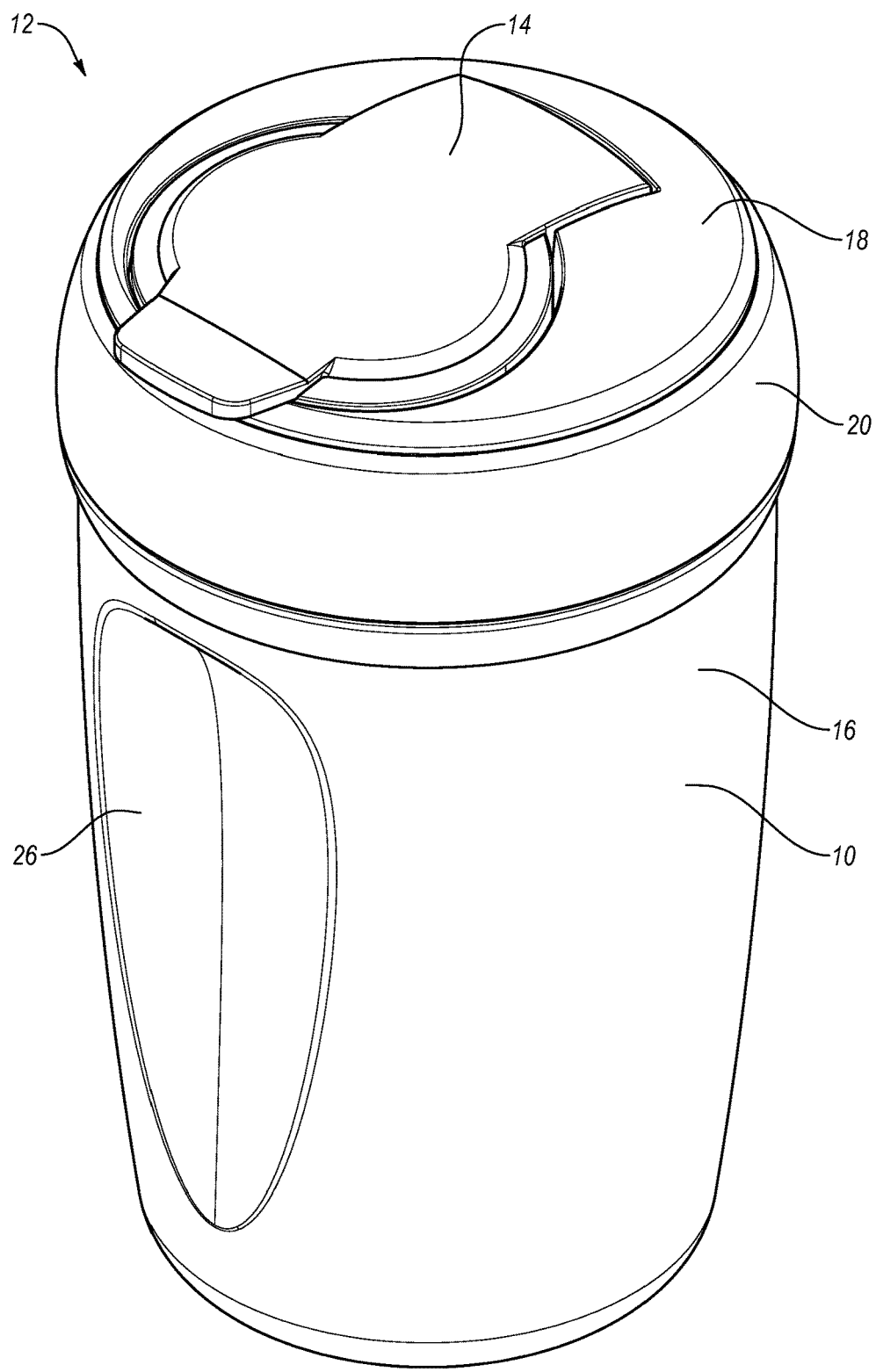
FIG. 1 is a perspective view of an exemplary container and an exemplary lid, illustrating the lid in an closed position.

The present invention is generally directed towards a container, an egg cracker and an egg separator, which may be used independently or in combination. The principles of the present invention are not limited to containers, egg crackers and egg separators. It will be understood that, in light of the present disclosure, the containers, the egg crackers and the egg separators may have a variety of shapes, sizes, configurations, and arrangements. It will also be understood that the containers, the egg crackers and the egg separators may include any suitable number and combination of features, components, aspects, and the like. In addition, while the containers, the egg crackers and the egg separators shown in the accompanying figures are illustrated as having particular styles and configurations, it will be appreciated that the containers, the egg crackers and the egg separators may have any suitable style or configuration. Further, the containers, the egg crackers and the egg separators disclosed in the present disclosure may be successfully used in connection with other types of objects and devices.

Additionally, to assist in the description of various exemplary embodiments of the containers, the egg crackers and the egg separators, words such as top, bottom, front, rear, sides, right, and left are used to describe the accompanying figures which may be, but are not necessarily, drawn to scale. It will further be appreciated the containers, the egg crackers and the egg containers may be disposed in a variety of desired positions or orientations, and used in numerous locations, environments, and arrangements.

In some situations, a user may desire to prepare a beverage or food item that contains multiple ingredients in a portable liquid dispensing container. The user may, for example, be away from home, at a gym, traveling, or the like. The user may also be without a mixing bowl or other items to aid in preparation of the beverage or the food item. In some situations, a user may desire to prepare the beverage or the food item in a same liquid dispensing container from which the user consumes the beverage or the food item, which may avoid dirtying or using a mixing bowl or other items used in preparation of the beverage or the food item. The beverage or the food item may include one or more eggs, and preparation of the beverage or the food item may involve breaking, separating, and/or mixing one or more eggs. Some embodiments described in the present disclosure may allow the user to break, separate, and/or mix the eggs using the container, which may particularly aid the user who is on the go.

Breaking an egg can be a difficult task to perform without damage to the yolk. In some cases, the egg may be broken by, for example, striking the egg against an edge of a mixing bowl or countertop. However, if too much force is used, the edge may extend too far past the shell and may damage the yolk. The egg cracker, as shown in the accompanying figures and described in more detail below, may be used to effectively break the egg without damaging the yolk. For example, the container may include an egg cracker, which may be coupled to a body of the container for support. In some embodiments, the egg cracker may extend across a portion of an opening of the container. The egg cracker may include a platform, which may be a generally planar or flat surface. The egg cracker may also include a protrusion, which may be at least proximate to an upper surface of the platform and the protrusion may be integrally formed with the platform as part of a unitary, one-piece structure. When the user strikes the egg against the protrusion, the protrusion may crack the egg and the platform, which may be disposed beneath or lower than the protrusion, may help prevent the protrusion from damaging the yolk. The platform may be sized and configured to have dimensions approximately equal to or greater than a length and/or a width of the egg, which may allow the platform to effectively stop an egg struck against the platform and prevent damage to the yolk.

Breaking an egg can also be a difficult task to perform consistently without breaking the shell into many, often tiny and unwanted, pieces. In some embodiments described in the present disclosure, the protrusion may be elongated and generally straight, which may aid in cracking the egg along an equator of the egg. Cracking the egg along the equator may allow a clean break and may prevent the egg shell from breaking into multiple small pieces. Cracking the egg in this manner may also avoid small pieces of the shell falling into the container. In order to facilitate cracking of the egg along the equator, the platform may include a straight edge on a proximal side of the platform and the platform may extend across at least a portion of the opening of the container. In these and other embodiments, the protrusion may be generally perpendicular to the straight edge of the platform, which may facilitate the user aligning the equator of the egg with the protrusion. Alternatively, the sides or edges of the platform may be curved or rounded. If desired, one or more of the edges of the platform may be symmetric with respect to an axis along which the protrusion is disposed, which may also facilitate the user aligning the equator of the egg with the protrusion.

Separating an egg, or removing a yolk from an egg white, can also be a difficult task and may occur in various ways once the egg is broken. For example, a person's fingers can be used to strain out the yolk, while the egg white runs into a mixing bowl. Alternatively, the person may attempt to crack the egg shell in half and carefully pass the yolk back and forth between the two halves of the egg shell while simultaneously draining the egg white into the mixing bowl. In some embodiments described in the present disclosure, the container may include an egg separator. The egg separator may include a concave portion, which may include one or more openings sized and configured to provide fluid communication with the container. In some cases, the yolk may be held or stored in the egg separator and may be used or disposed of at a later time.

Further, the egg separator and/or the egg cracker may be at least partially disposed within an opening of the container, which may help prevent the egg from soiling the outside of the container or surrounding areas when it is separated and/or cracked. In some embodiments, the egg separator and/or the egg cracker may also be covered or enclosed by a lid of the container when the lid is attached to the body of the container, to further prevent any mess.

Please note that exemplary embodiments are disclosed and described in detail below. It will be understood that different embodiments may have different parts, components, features and aspects; and the different parts, components, features and aspects may not be required. Further, it will be understood that different embodiments may include various combinations of these parts, components, features and aspects depending, for example, upon the intended use of the system.

The term "coupled" may be used to mean that two or more elements are in direct physical contact. The term "coupled" may also mean that two or more elements are not in direct contact with each other, but yet still cooperate or interact with each other.

As shown in FIG. 1, an exemplary container 10 may hold one or more liquids, fluids, solutions, and the like. The container 10 may allow the contents to be stirred, shaken, mixed, and/or blended as desired. This may allow protein drinks, shakes, smoothies, dressings, sauces, batters, etc. to be created and/or stored within the container 10. Advantageously, the container 10 may be reusable and refillable, which may allow the container to be used for many different purposes over an extended period of time. The container 10 may also be easily carried and portable. For example, the container 10 may be conveniently held in one-hand by the user. Also, the inside surfaces of the container 10 may be smooth and at least substantially without grooves, crevices, and the like to prevent items, particles, or materials from getting caught during mixing and/or dispensing of the contents from the container. Additionally, if desired, the container 10 may be insulated to help keep the contents at a desired temperature, such as at a lower or higher temperature. Advantageously, the container 10 may include a small number of parts and components, which may facilitate manufacturing and assembly. Additionally, the container 10 may include measurement markings to facilitate measuring and dispensing of the contents of the container.

As shown in the accompanying figures, the container 10 may include a lid 12 with an opening. The opening may provide access to the contents of the container 10 without requiring removal of the lid 12 from the container. The container 10 and the lid 12 may have a variety of shapes, sizes, configurations, and arrangements depending, for example, upon the intended use of the container and/or lid. In some embodiments, a cover or closure 14 may selectively cover the opening of the lid 12. FIG. 1 illustrates the cover 14 in a closed position. In some embodiments, the cover 14 may have a shape that generally corresponds to a shape of the opening of the lid 12, and the cover may form a watertight and leak-proof seal with the opening of the lid 12 when the cover is in the closed position.

The lid 12 may be sized and configured to be attached to a body 16 of the container 10. If desired, the lid 12 may be easily attached and/or detached from the body 16, which may allow the lid and the container to be easily cleaned. The lid 12 may also allow the container 10 to be easily filled from various sources.

Figure 8B:
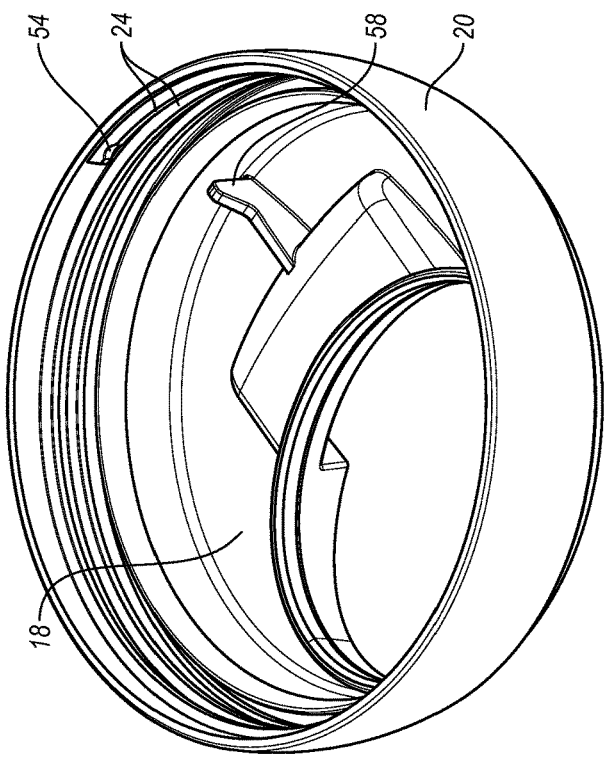
FIG. 8B is a lower perspective view of the lid shown in FIG. 8A.
Figure 8A:
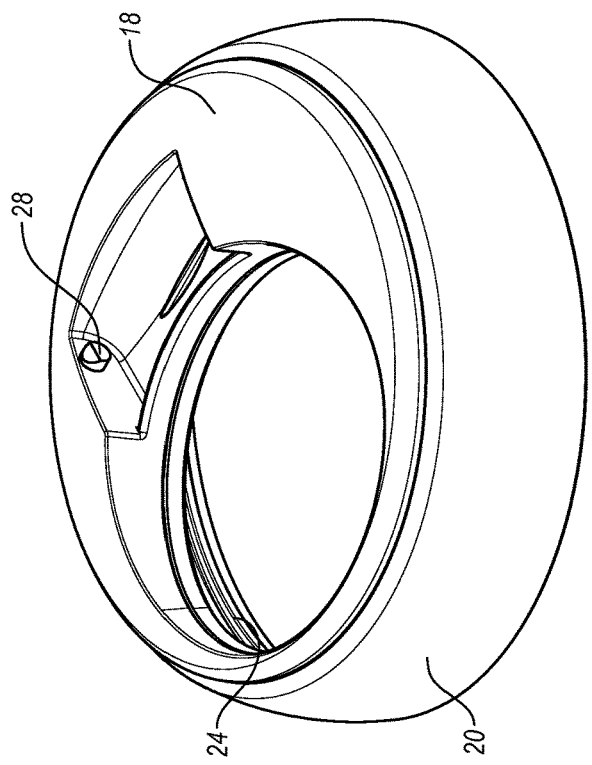
FIG. 8A is an enlarged upper perspective view of the lid shown in FIG. 1.

In some embodiments, the lid 12 may include an end wall 18 and a skirt wall 20 depending from the end wall. The end wall 18 and the skirt wall 20 may serve to close the container 10 when the cover 14 is in the closed position. The skirt wall 20 may facilitate securing the lid 12 to the container 10 by one or more threads, a press or snap fit, or other similar structure. For example, as illustrated in FIGS. 3 to 6 and FIGS. 9A and 9B, the body 16 of the container 10 may include external threads 22. As illustrated in FIGS. 8A and 8B, the skirt wall 20 may include corresponding internal threads 24 for securing the lid 12 to the body 16. After reviewing this disclosure, one of ordinary skill in the art will appreciate that the container 10 and the lid 12 may be coupled in various suitable manners.

As illustrated in the accompanying figures, the container 10 may have a generally cylindrical configuration. If desired, the container 10 may include one or more gripping portions 26, such as a recesses, grooves, and/or textured surfaces, which may facilitate holding the container 10 and/or breaking, separating, and/or mixing the egg. It will be appreciated that the gripping portions 26 may be any suitable combination of protrusions, projections, bumps, recesses, indentations, textured surfaces, and the like. The gripping portions 26, however, are not required. It will be appreciated that the container 10 may have various shapes, sizes, configurations and arrangements depending, for example, upon the intended use of the container.

The container 10 and/or the lid 12 may be constructed from durable, long-lasting materials. The container 10 and/or the lid 12 may also be constructed from materials that allow them to be reused and/or recycled. For example, the container 10 and/or the lid 12 may be constructed from plastic and the plastic may allow the container 10 and/or the lid 12 to be reused and/or recycled. Other components, such as the egg separator and/or egg cracker, which are discussed in more detail below, may also be constructed from durable, rigid, reusable and/or recyclable materials. In view of this disclosure, one of ordinary skill in the art will appreciate that the container 10, the lid 12, the egg separator, the egg cracker, etc., may be constructed from various materials with desired properties and characteristic such as different types of plastics, glass, metal, composites and the like. Additionally, the container 10, the lid 12, the egg separator, and the egg cracker, etc. may be constructed from at least partially transparent or translucent materials, which may allow the user to see the type and amount of fluids in the container 10. Furthermore, the container 10, the lid 12, the egg separator, the egg cracker, etc. may be constructed from disposable and/or biodegradable materials. For example, the container 10 may be constructed of the disposable and/or biodegradable material and other parts of the container 10 may be constructed of non-disposable and/or non-biodegradable material.

Figure 2:
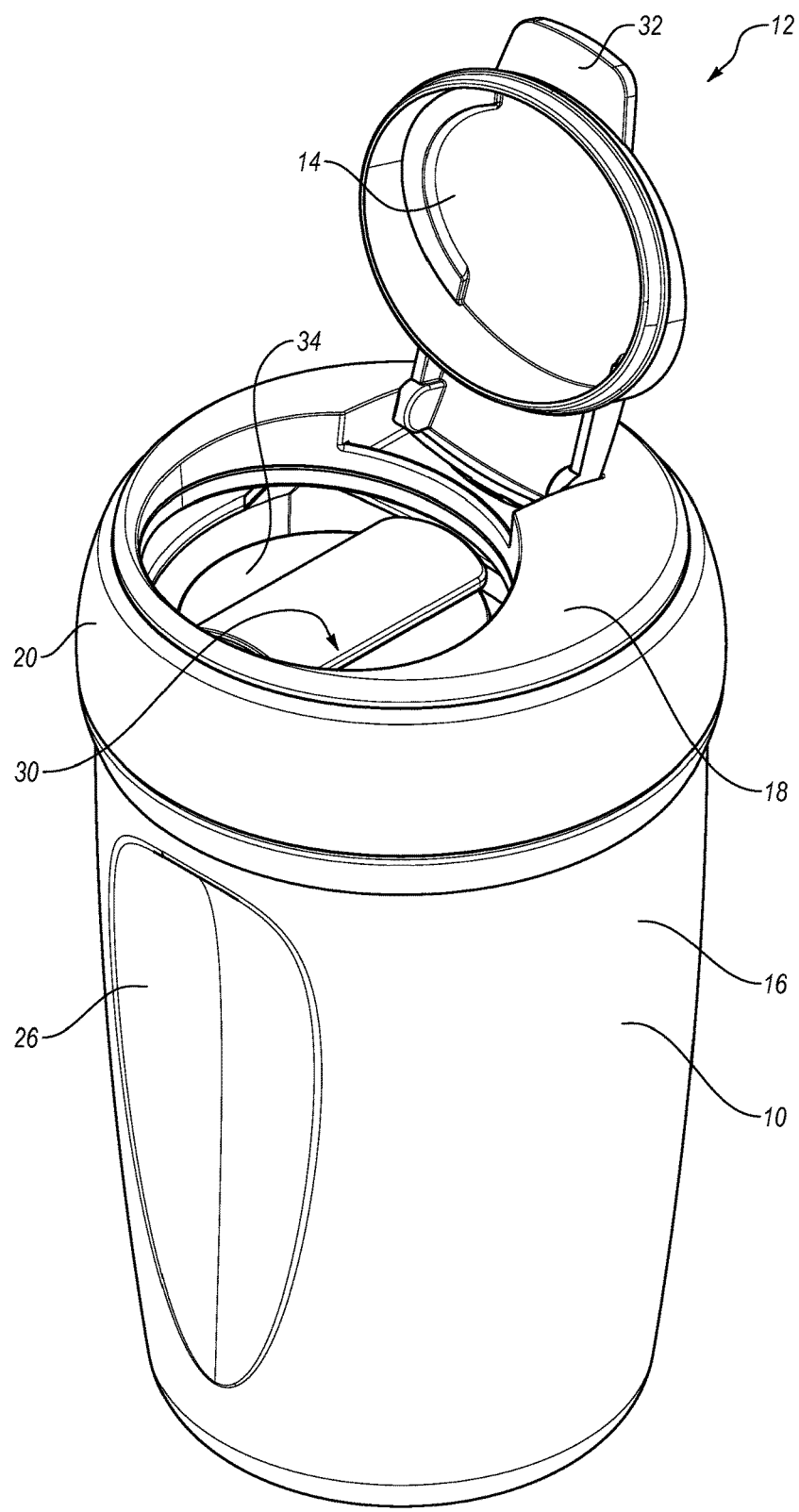
FIG. 2 is another perspective view of the container and lid shown in FIG. 1, illustrating the lid in an open position and showing a portion of an exemplary egg cracker and exemplary egg separator disposed within the container.

FIG. 2 illustrates the cover 14 of the lid 12 in an open position and the cover 14 may allow access to the contents of the container 10 when the cover is in the open position. When the cover 14 is in the open position, the cover may be disposed at any number of angles with respect to the lid 12. FIG. 2 illustrates the cover 14 disposed at approximately ninety (90) degrees with respect to the lid 12. When the cover 14 is in the open position, it may be disposed, for example, between zero (0) and one hundred eighty (180) degrees with respect to the lid 12. With combined reference to FIG. 2, FIGS. 7A and 7B, and FIG. 8A, the cover 14 may be attached to the lid 12 by one or more pivot mounts or hinge connections 28, which may be disposed in one or more receiving portions 29 in the cover 14. In some embodiments, the hinge connections 28 and the receiving portions 29 may be located towards a rear portion of the lid 12 and at least proximate an opening 30 of the lid 12. As shown in the accompanying drawings, the opening 30 being disposed towards a front of the lid 12 and the opening may be disposed in the end wall 18 of the lid. When an upward force is applied to an end 32 of the cover 14, which may be disposed on an opposite end as the hinge connections 28 and the receiving portions 29, the cover may rotate upwardly to an open position. When the cover 14 is in the open position, a user to drink and/or pour the contents from the container 10.

An egg separator 34 may be disposed within the container 10. In particular, the egg separator 34 may be disposed beneath the opening 30 of the lid 12, which may allow for easy disposal of one or more separated yolks held or stored in the egg separator 34. In some embodiments, the user may selectively remove the egg separator 34, for example, for cleaning, when separation of the egg is not desired, and/or after the egg has been separated and the user desires to dispose of the yolk. Advantageously, the opening 30 in the lid 12 may be sized and configured to have a corresponding shape and/or be at least as large as the egg separator 34, which may facilitate removal of the egg separator through the opening, without removal of the lid 12, if desired. In some embodiments, when the egg separator 34 is removed, the user may drink or pour the contents of the container 10 without the egg separator 34 obstructing fluid flow through the opening 30.

Figure 3:
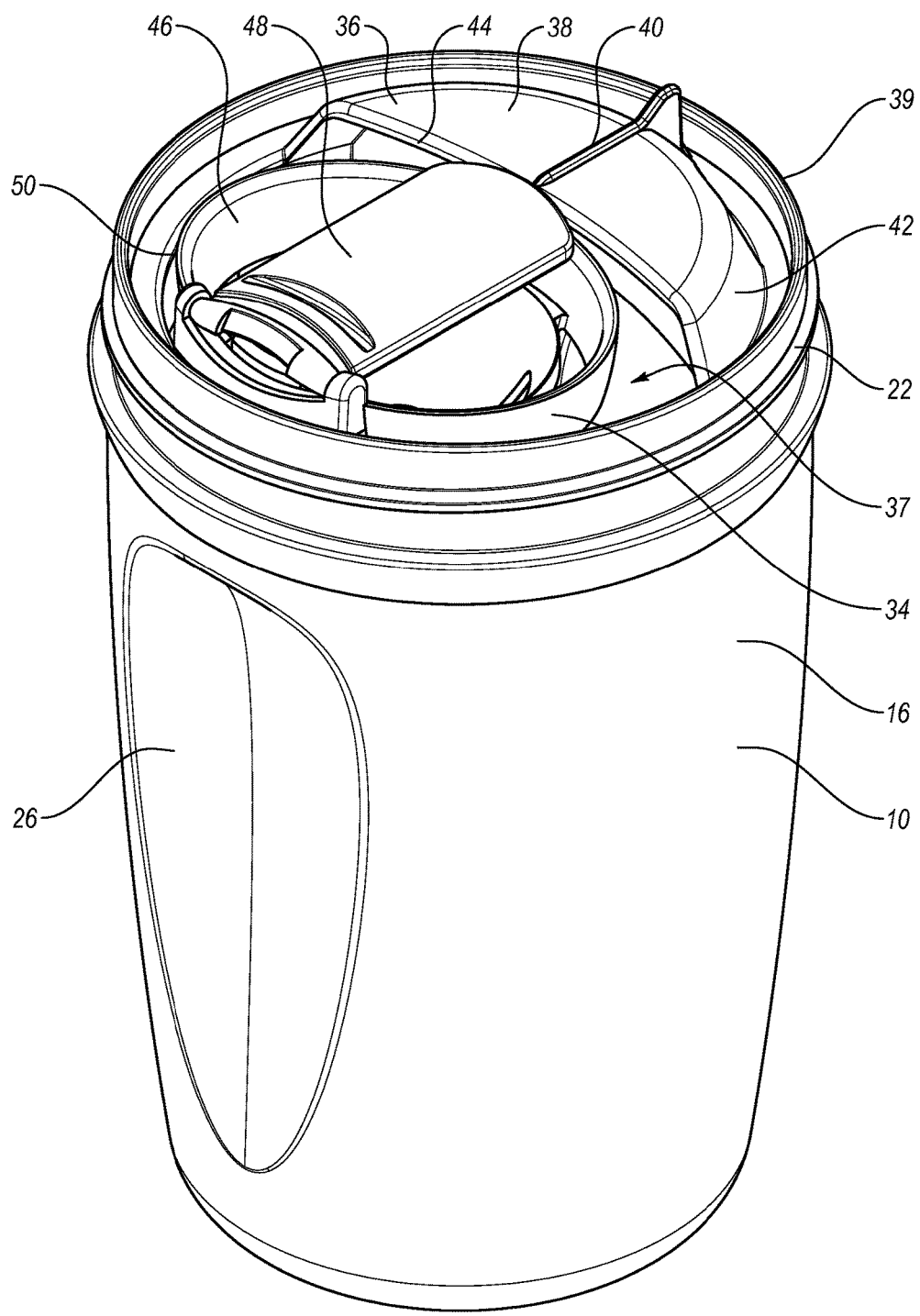
FIG. 3 is a perspective view of the container shown in FIG. 1, illustrating the lid removed and showing the egg cracker and the egg separator disposed in the container.

As shown in FIG. 3, an exemplary egg cracker 36 may be disposed within the container 10. In particular, the egg cracker 36 and/or the egg separator 34 may be at least partially disposed within an opening 37 of the container 10. In these embodiments, when the lid 12 is attached to the container 10, the egg cracker 36 and/or the egg separator 34 may be enclosed by the container and the lid. In addition, at least a portion of the egg cracker 36 may extend across a portion of the opening 37 of the container 10.

The egg cracker 36 may include a platform 38, which may be raised above an upper portion of the container 10. In particular, an upper surface of the platform 38 may be disposed above an upper edge 39 of the container 10. If the platform 38 is disposed above the upper edge 39 of the container 10, that might facilitate use of the egg cracker 36. The platform 38 could also be generally aligned or planar with the upper edge 39 of the container 10, or disposed below the upper edge of the container. The platform 38 may be supported by one or more support walls 42 and the platform 38 may provide a sturdy, stable surface upon which a user may strike an egg. As shown in the accompanying figures, the platform 38 may include a generally planar and/or flat upper surface and the platform may be disposed in a generally horizontal configuration.

Figure 4:
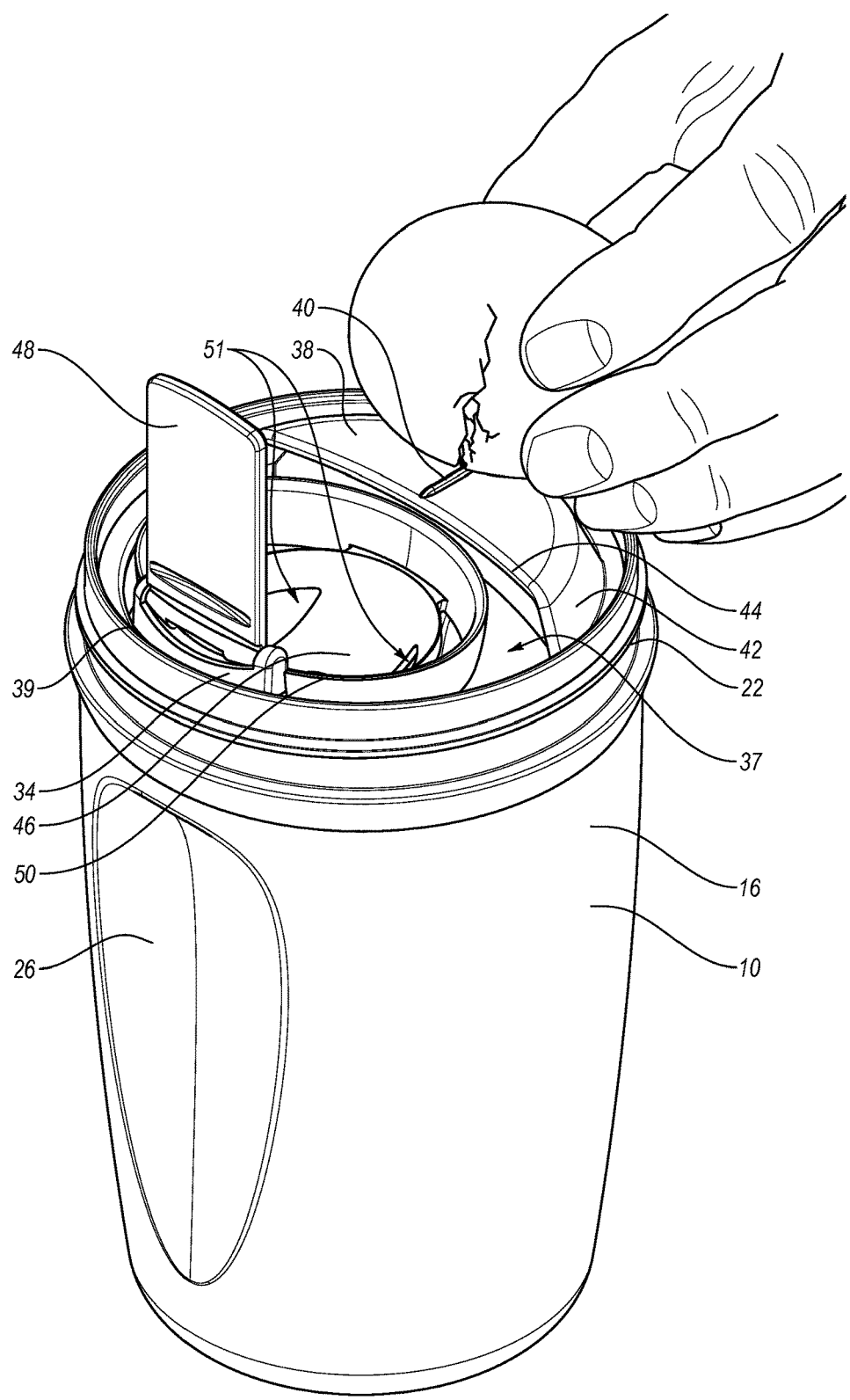
FIG. 4 is a perspective view of the container, egg cracker and egg separator shown in FIG. 3, illustrating a handle of the egg separator in an open position and a user cracking an egg with the egg cracker.

The egg cracker 36 may include a protrusion 40, which may be disposed at least proximate an upper surface of the platform 38. The protrusion 40 may be integrally formed with the upper surface of the platform 38 as part of a unitary, one-piece structure, if desired. The protrusion 40 may be sized and configured to crack the egg when the user strikes the egg against the platform 38, as illustrated in FIG. 4. The protrusion 40 may extend generally upwardly and may extend across at least a majority or at least substantially across an entire width of the platform 38. The protrusion 40 may have a generally constant height, and the protrusion may have a height that is intended to break the shell when an egg is being cracked. The protrusion 40, as illustrated in FIG. 3, may be elongated, disposed in a straight line, and generally aligned with a center of the container 10.

In greater detail, the protrusion 40 may extend along a width of the platform 38, and the length of the protrusion may be approximately equal to the width of the platform. The protrusion 40 may divide the platform 38 into approximately equal sized halves and the protrusion may be disposed along a center of an upper surface of the platform.

In order to facilitate cracking of the egg along the equator, the platform may include an edge 44 that extends along a length of the platform 38. The edge 44 may also extend across the opening 37 of the container 10. The edge 44 may be generally straight and the protrusion 40 may be generally perpendicular to the edge. Alternatively, the edge 44 may be curved and symmetric with respect to an axis along which the protrusion 40 is disposed. The edge 44 may facilitate the user aligning the equator of the egg with the protrusion 40.

The egg separator 34 may also be disposed within the opening 37 of the container 10. In particular, the egg separator 34 and the egg cracker 38 may each be at least partially disposed in different portions of the opening 37. The egg separator 34 may include a body, a concave portion 46 and a handle 48. The handle 48 may be foldable to facilitate use of the egg separator. The handle 48 may also permit the egg separator 34 to be disposed within the opening 37 when the lid 12 is secured to the container 10. As illustrated in FIG. 3, the handle 48 may at least partially cover the concave portion 46 when the handle is in a closed position. The handle 48 may be attached to the body of the egg separator 34 by one or more pivot mounts or hinge connections, which may be disposed at least proximate to a lip or edge 50 of the egg separator. The edge 50 may extend around a perimeter or circumference of the egg separator 34. When an upward force is applied to the handle 48, the handle may rotate upward to an open position, which is illustrated in FIG. 4. The handle 48 may also be rotated in an opposite direction and into a closed position.

The concave portion 46 of the egg separator 34 may include one or more openings 51, and the openings may facilitate separating of the egg. For example, the openings 51 may allow the yolk to be separated from the other portions of the egg. The openings 51 may also be sized and configured to provide fluid communication with the container 10. For example, when the egg separator 34 is used in combination with the container 10, the contents of the cracked egg may be placed in the egg separator 34 and the egg white may be allowed to flow through the openings 51 and into the container. The openings 51, however, may hold the yoke within the egg separator 34 and the handle 48 may allow the egg separator to be easily removed. It will be appreciated that the openings 51 may have various shapes, sizes, configurations and arrangements depending, for example, upon the intended use of the container 10 and/or egg separator 34.

Figure 5:
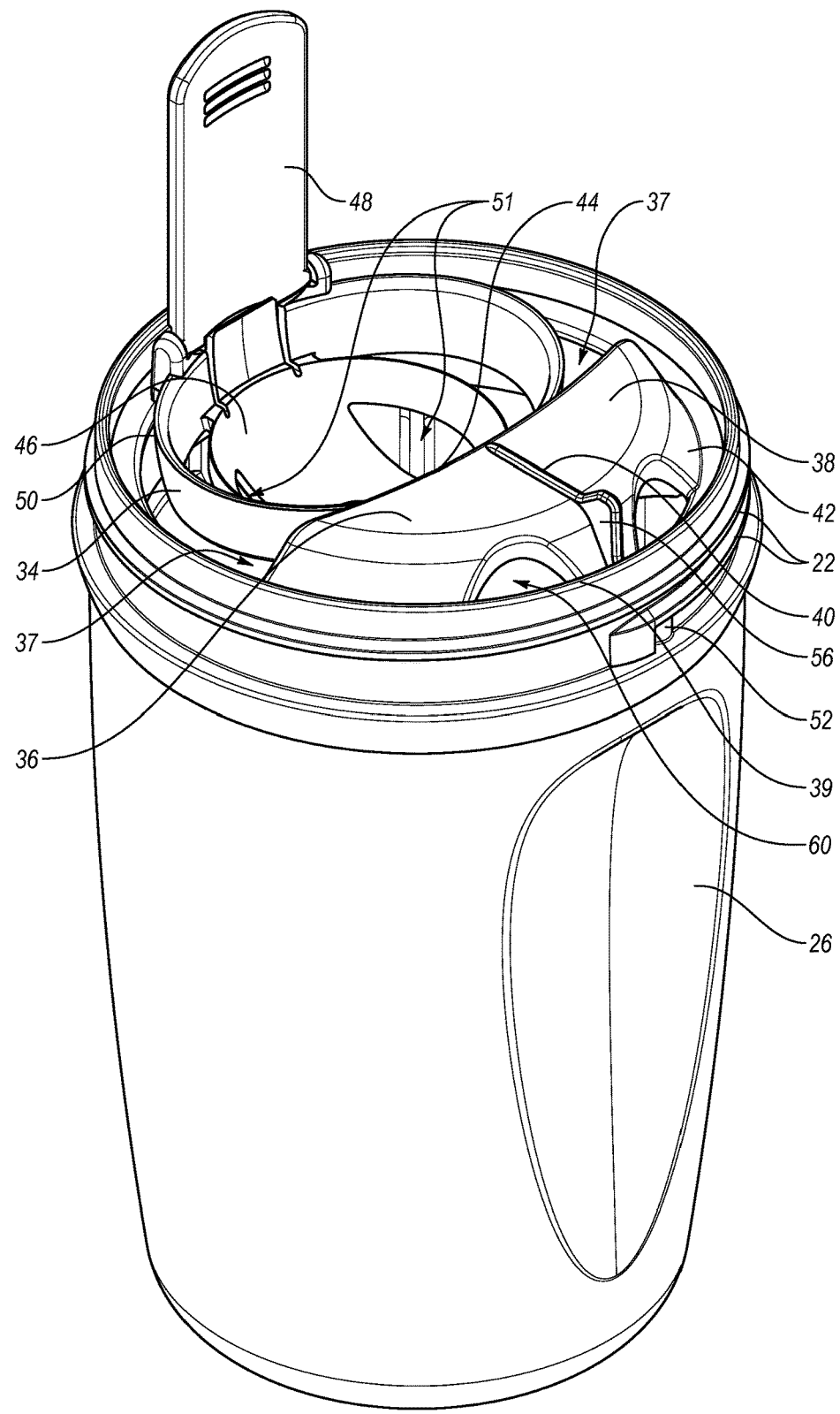
FIG. 5 is another perspective view of the container, egg cracker and egg separator shown in FIG. 3, illustrating the handle of the egg separator in the open position.

As illustrated in FIG. 5, the external threads 22 on the upper, outer surface of the container 10 may include a terminal abutment or shoulder 52. The internal threads 24 of the lid 12 may include a corresponding terminal abutment 54, as illustrated in FIG. 8B. This may allow the lid 12 may be secured to the container 10 by matingly engaging threads 22 and 24, and rotating the lid 12 in an appropriate direction (some embodiments contemplate left-handed threading while other embodiments contemplate right-handed threading) until the corresponding terminal abutments 52, 54 meet thereby arresting the user's ability to threadingly rotate the lid 12. In this way, the lid 12 can be repeatedly and consistently secured to the container 10 so as to maintain a liquid tight sealing engagement without over tightening the lid 12. In addition, in such embodiments where it is desirable to maintain a specific mating orientation between the lid 12 and the container 10, such can be accomplished by positioning shoulder 52 at an appropriate location during the manufacturing process. For example, the shoulder 52 may be located such that the lid 12 is always oriented or aligned with the opening 30 of the lid 12.

The egg cracker 36 may include an engaging portion 56, which may be aligned with the protrusion 40. The engaging portion 56 may be configured to contact a corresponding engaging portion 58 of the lid 12, which is illustrated in FIG. 8B. As shown in the accompanying figures, the engaging portion 56 may extend generally upwardly from the egg cracker 36. In particular, the engaging portion 56 may extend upwardly relative to the upper surface of the platform 38. The engaging portion 56 may extend above the protrusion 40 on the upper surface the platform 38. The egg cracker 36, the platform 38, the protrusion 40 and the engaging portion 56 may be integrally formed as part of a unitary, one-piece structure, if desired. The engaging portions 56, 58 may also facilitate alignment of the container 10, the lid 12, the egg separator 34 and/or the egg cracker 36. For example, the engaging portion 58 of the lid 12 may abut the engaging portion 56 of the egg cracker 36 as the lid is rotated or being connected to the container 10. This may, for example, apply a force to the engaging portion 56 and this may cause the egg cracker 36 to rotate with the lid 12. In particular, the lid 12 may rotate relative to the container 10 until the corresponding terminal abutments 52, 54 meet. When the corresponding terminal abutments 52, 54 meet, the lid 12 may be secured to the container 10 and the opening 30 of the lid may be aligned with a desired portion of the egg cracker 36, such as where the egg separator 34 may be located and/or a portion that is opposite the platform 38, which may prevent the platform and/or one or more of the support walls 42 from blocking dispensing of contents through the opening.

As illustrated in FIG. 8B, the engaging portion 58 of the lid 12 may extend generally downwardly from an internal surface of the lid. When the lid 12 is secured to the container 10 by rotating the lid in an appropriate direction (some embodiments contemplate left-handed threading while other embodiments contemplate right-handed threading), the engaging portion 56 and the engaging portion 58 may meet and the lid 12 and the egg cracker 36 may rotate together until the corresponding terminal abutments 52, 54 meet, arresting the user's ability to rotate the lid 12.

As illustrated in FIG. 5, the platform 38 of the egg cracker 36 may be raised and supported by a connecting member, for example, the support wall 42. The support wall 42 may include one or more apertures or gaps 60. The apertures 60 could have various shapes, sizes, configurations and arrangements depending, for example, upon the intended use of the container 10. When the egg is cracked on the egg cracker 36, a portion of the egg may spill onto the egg cracker 36, and the apertures 60 may allow the spilled portion to drain into the container 10. The apertures 60 may also be sized and configured to separate the yolk from the egg white. For example, the apertures 60 may be smaller than the yolk. The yolk and the egg white may both be placed in the container 10 after the egg is cracked and the egg white may be dispensed through the apertures 60 while the yolk is retained in the container behind the egg cracker 36. In some embodiments, the lid 12 may be removed in order to pour contents of the container 10 through the apertures 60. The apertures 60 may further facilitate removal of the egg cracker 36 from the container 10. For example, a user may insert his or her digit or digits into the apertures 60 to remove the egg cracker 36 from the container 10.

As discussed above, the egg cracker 36 may be selectively inserted and removed from the container 10. Advantageously, the egg cracker 36 may simply be placed in an upper portion of the container 10 and the egg cracker may be held in positions by one or more flanges, engaging surfaces and the like. The egg cracker may also be held in position by a friction, interference or snap fit, if desired. The egg cracker 36 may be removed by simply lifting from a bottom side of the platform 38. After reviewing this disclosure, one of ordinary skill in the art will recognize that the container 10, the lid 12, the egg separator 34, and the egg cracker 36 may have a variety of suitable shapes, sizes, arrangements and configuration depending, for example, upon the intended use of the container.

Figure 6:
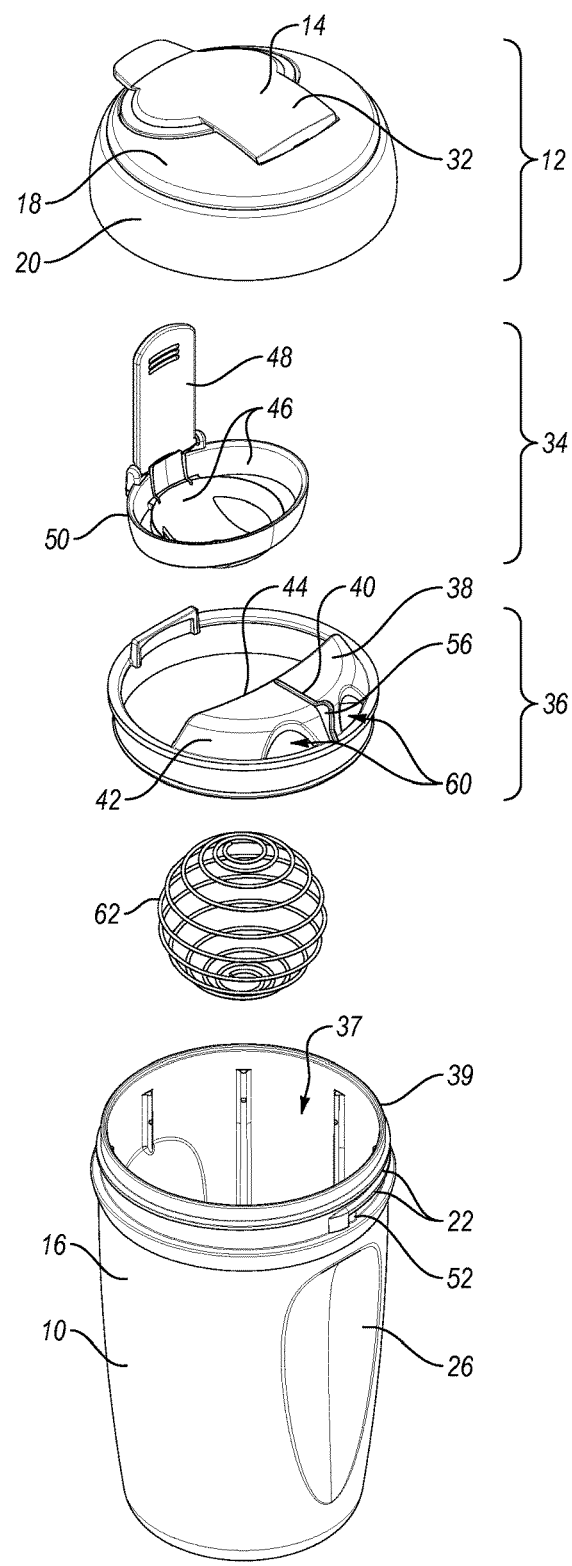
FIG. 6 is an exploded perspective view of the container, the egg cracker, the egg separator and the lid, and illustrating an exemplary mixing device.
Figure 7B:
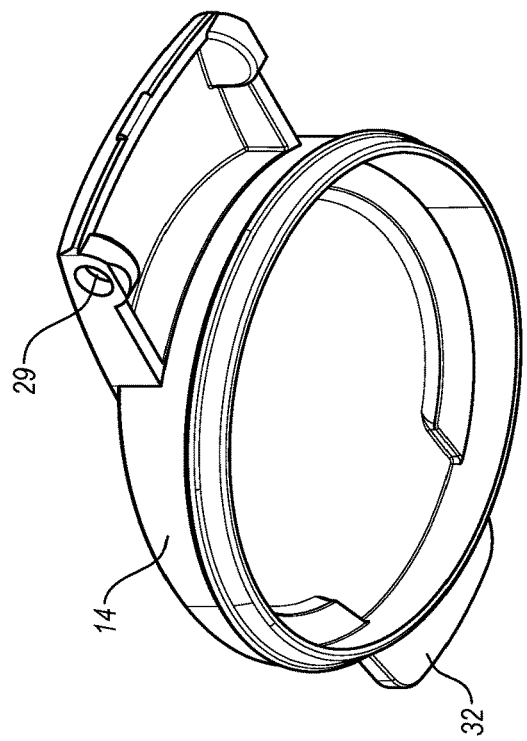
FIG. 7B is a lower perspective view of the cover for the lid shown in FIG. 7A.
Figure 7A:
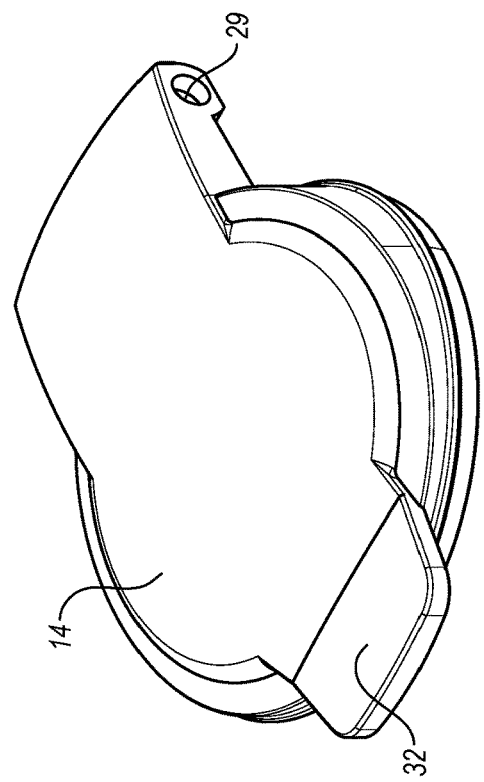
FIG. 7A is an enlarged upper perspective view of a cover for the lid shown in FIG. 1.

As shown in FIG. 6, a mixing device, such as a BLENDER BALL®, available from the Blender Bottle Company, Lehi, Utah, (www.blenderbottle.com) 62, may be disposed inside the container 10. The BLENDER BALL 62 may be configured to facilitate blending of the contents of the container 10.

As mentioned above, the container 10 may be sized and configured to be filled with a wide variety of fluids. For example, the container 10 could hold one or more liquids, beverages, drinks, juices, vitamin-enhanced beverages, energy drinks, thirst-quenchers, flavored waters, and the like. The container 10 could also hold various powders, mixtures, and/or solutions, which could include vitamins, supplements, powdered drinks, electrolyte pills, protein powders, medicinal products, baby formulas, etc. The container 10 could hold solids and/or other types of materials including foodstuffs such as fruits, vegetables, soups, dressings, sauces, batters, baking materials, and the like. The container 10 could further hold non-edible fluids, which could include paint, household cleaners, etc.

In some embodiments, the container 10 may include an internal circumferential lip, integrally formed ring, a ledge, or circumferential protrusions 64 configured to retain the egg cracker 36 within the opening 37 of the container 10. In these and other embodiments, the egg cracker 36 may be retained within the opening 37 and may extend above the opening and/or the upper edge 39 of the container 10. As illustrated in FIGS. 10A and 10B, the egg cracker 36 may include a corresponding circumferential lip, integrally formed ring, or ledge 68 configured to engage the circumferential protrusions 64 of the body 16 so as to retain the egg cracker 36 within the opening 37.

As also illustrated in FIGS. 10A and 10B, the ledge 68 may be disposed on a ring-shaped portion 70 of the egg cracker 36. The ring-shaped portion 70 may be sized and configured to fit into the opening 37 of the container 10 and may correspond to a size and shape of the opening 37. In some embodiments, the egg separator 34 may be coupled to the ring-shaped portion 70 of the egg cracker 36 in various ways. For example, the ring-shaped portion 70 of the egg cracker 36 may include an insert 72 for a press or snap fit with a corresponding receiving portion of the egg separator 34. An exemplary receiving portion 73 is illustrated in FIG. 11B.

In some embodiments, the platform 38 may be integrally formed and/or attached to the ring-shaped portion 70. In these embodiments, the platform 38 may extend in a plane approximately equal to a height of the ring-shaped portion 70. In other embodiments, the support wall 42 may be integrally formed with and/or attached to the ring-shaped portion 70. After reviewing this disclosure, one of ordinary skill in the art will appreciate that the ring-shaped portion 70 is optional and the platform 38, the protrusion 40, and/or the support wall 42 may be directly attached to the container 10.

Figure 11B:
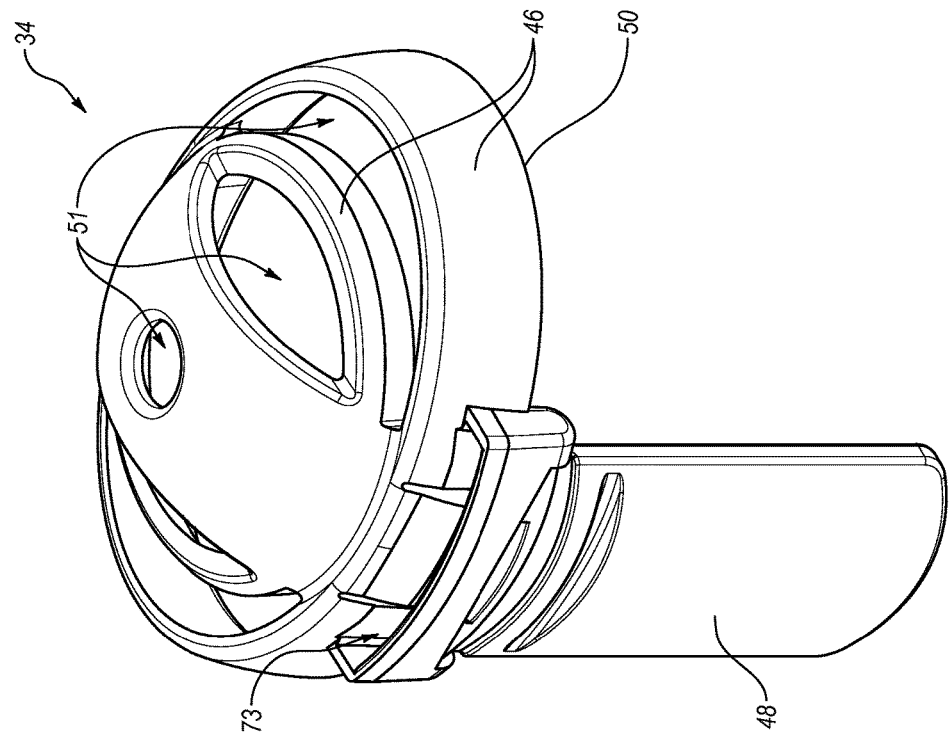
FIG. 11B is an enlarged lower perspective view of the egg separator shown in FIG. 11B, illustrating the handle of the egg separator in the open position.
Figure 11A:
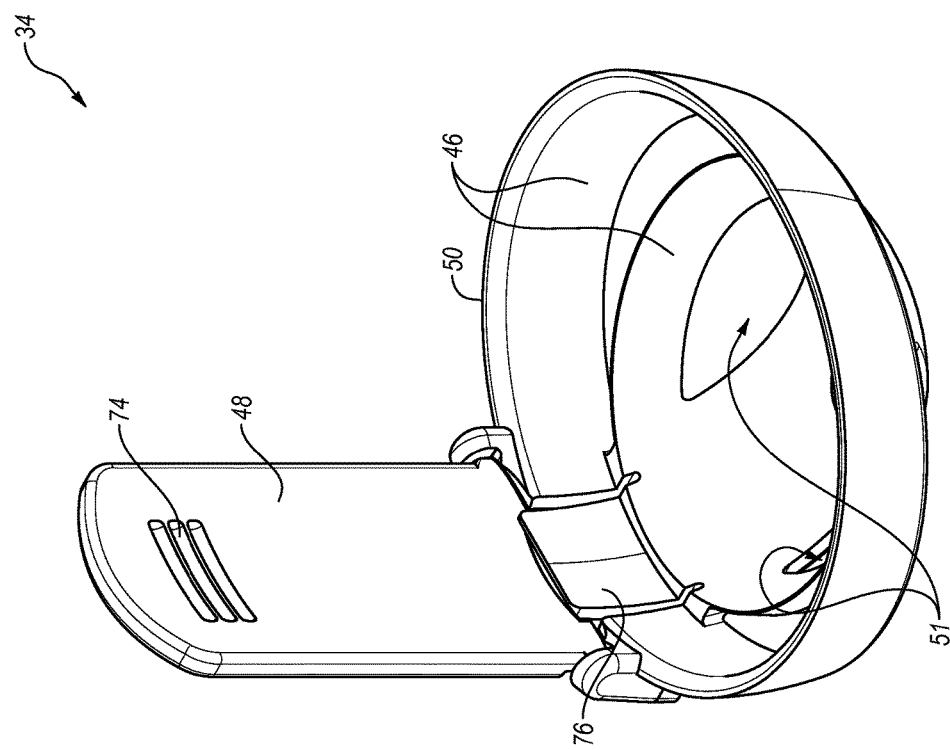
FIG. 11A is an enlarged upper perspective view of the egg separator shown in FIG. 3, illustrating the handle of the egg separator in the open position.

As shown in FIGS. 11A and 11B, when the handle 48 is in the open position, the user may pull upward on the handle to remove the egg separator 34 from the container 10 when the lid 12 is removed. The user may also pull upward on the handle to remove the egg separator 34 from the container 10 through the opening 30 in the lid 12 when the lid is attached. Pulling upward on the handle 48 may remove the insert 72 from the receiving portion 73.

If desired, the handle 48 may include one or more gripping portions 74, such as recesses, grooves, and/or textured surfaces. It will be appreciated that the gripping portions 74 may be any suitable combination of protrusions, projections, bumps, recesses, indentations, textured surfaces, and the like.

When the handle 48 is in a closed position, as illustrated in FIG. 3, the handle 48 may be prevented from extending below the edge 50 and/or into the concave portion 46 by an extension 76, which may extend above the edge 50 to approximately a height of the hinge connections of the handle.

Figure 12:
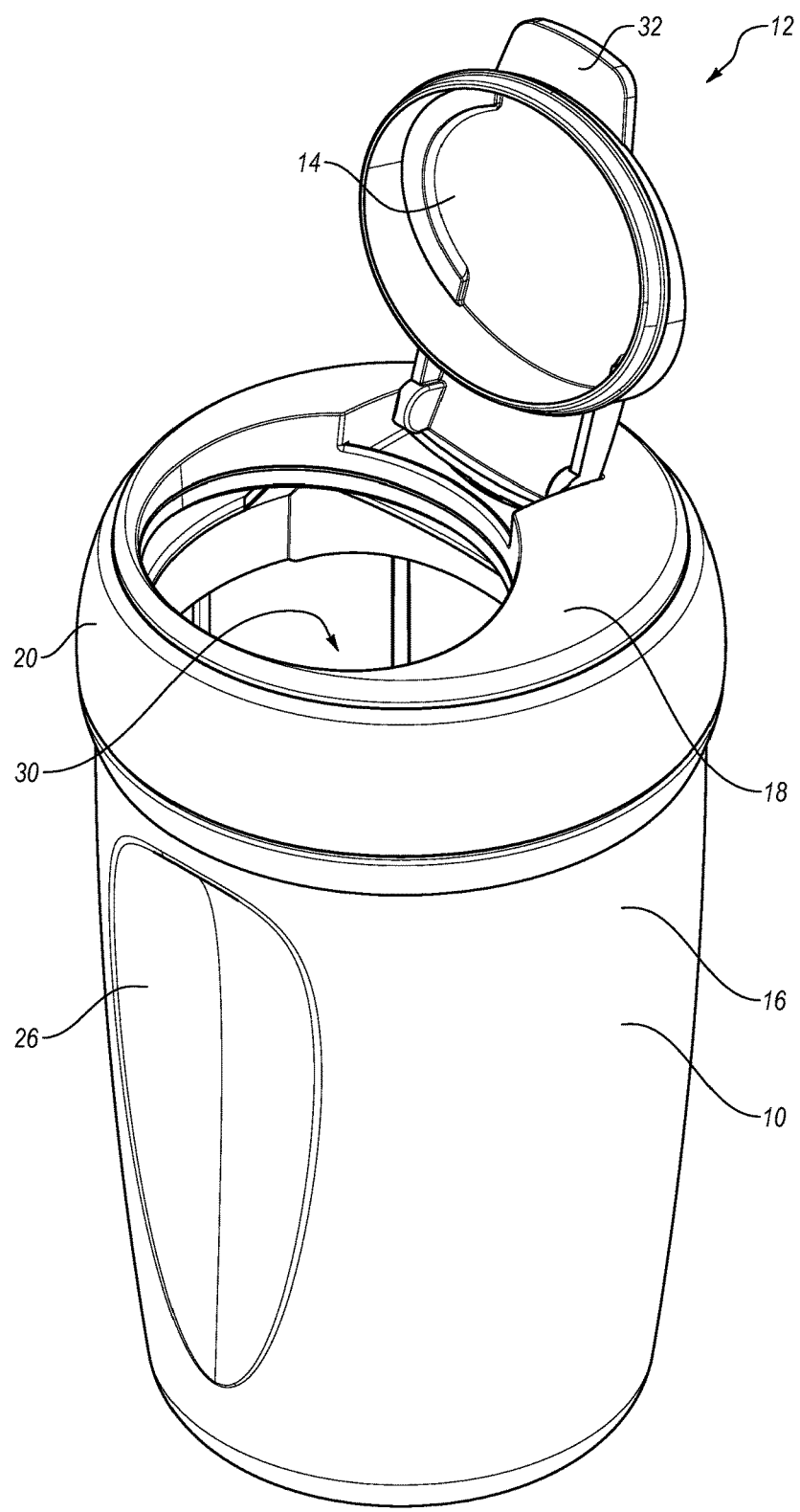
FIG. 12 is a perspective view of another exemplary container, exemplary lid and exemplary egg cracker, illustrating the lid in an open position.
Figure 13:
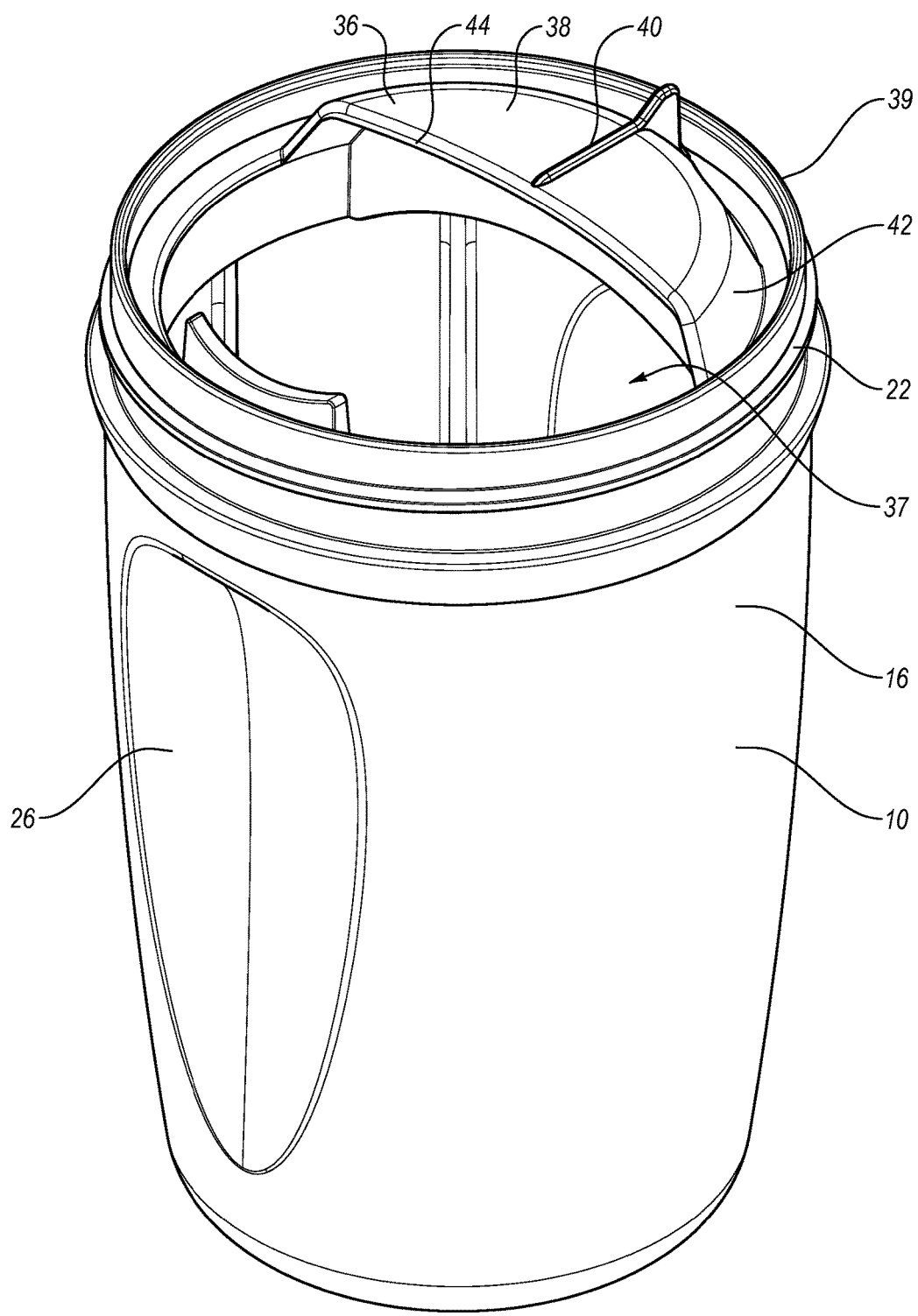
FIG. 13 is a perspective view of the container and the egg cracker shown in FIG. 12.

As illustrated in FIGS. 12 and 13, in some embodiments, the container 10 may not include an egg separator.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An egg cracker comprising:
   an annular support ring;
   a mesa structure including a planar upper surface;
   a ridge extending upwardly directly from the planar upper surface of the mesa structure, the ridge and the planar upper surface forming an egg cracking structure; wherein a maximum height of the ridge above the planar upper surface of the mesa structure is slightly larger than or equal to an average thickness of an egg shell; and
   one or more connecting members connecting the mesa structure and the annular support ring, the one or more connecting members comprising a support wall that extends upward from a top of the annular support ring to the planar upper surface of the mesa structure, wherein the support wall has at least one aperture to permit a portion of the egg that is spilled when the egg is cracked to drain through the support wall;
   wherein an egg is cracked by impacting the egg with the ridge and the planar upper surface of the mesa structure.

2. The egg cracker as in claim 1, wherein the annular support ring is sized and configured to be disposed within a container.

3. The egg cracker as in claim 1, further comprising an opening disposed adjacent to the mesa structure, the opening sized and configured to selectively receive an egg separator.

4. The egg cracker as in claim 3, wherein the opening is at least partially defined by an inner surface of the mesa structure and an inner surface of the annular support ring.

5. The egg cracker as in claim 1, further comprising a container, the annular support ring of the egg cracker sized and configured to at least partially engage an upper portion of the container.

6. The egg cracker as in claim 5, further comprising a lid that is selectively attachable to the container, the egg cracker enclosed by the container and the lid when the egg cracker is disposed within the upper portion of the container and the lid is attached to the container.

7. The egg cracker as in claim 1, wherein the mesa structure is disposed within a cylinder aligned with an outer perimeter of the annular support ring.

8. The egg cracker as in claim 1, wherein the ridge is centrally located on the planar upper surface of the mesa structure; and wherein the ridge is generally aligned with an axis aligned with a center of the annular support ring.

9. The egg cracker as in claim 1, wherein the planar upper surface of the mesa structure is disposed above an upper surface of the annular support ring.

10. A system for cracking an egg, the system comprising:
a container;
a lid for the container, the lid selectively attachable and removable from the container; and
an egg cracker sized and configured to be at least partially disposed within the container, the egg cracker enclosed by the container and the lid when the lid is attached to the container, the egg cracker comprising:
an outer support structure that contacts the container and supports the egg cracker within the container;
a platform with a planar upper surface;
a ridge extending upwardly directly from the planar upper surface of the platform and substantially across a width of the platform, the ridge and the planar upper surface forming an egg cracking structure, wherein a maximum height of the ridge above the planar upper surface of the platform is slightly larger than or equal to an average thickness of an egg shell; and
one or more connecting members connecting the platform and the outer support structure, the one or more connecting members comprising a support wall that extends upward from a top of the outer support structure to the platform, wherein the support wall has at least one aperture to allow a portion of contents of a cracked egg that is spilled when the egg is cracked to drain through the support wall.

11. The system for cracking an egg as in claim 10, wherein the egg cracker is selectively removable from the container.

12. The system for cracking an egg as in claim 10, further comprising:
an opening in the lid of the container;
a cover for the opening in the lid of the container; and
an alignment member that aligns the opening in the lid with an opening in the egg cracker when the lid is being attached to the container.

13. The system for cracking an egg as in claim 10, wherein the outer support structure of the egg cracker comprises an annular support ring, the annular support ring having an outer diameter that allows at least a portion of the annular support ring to be disposed within an upper portion of the container, the annular support ring engaging at least a portion of the container to support the egg cracker within the container.

14. The system for cracking an egg as in claim 10, wherein the support wall lies on a frustoconical surface.

15. The system for cracking an egg as in claim 10, further comprising an outwardly extending flange of the outer support structure of the egg cracker, the flange sized and configured to contact an upper surface of the container.

16. The system for cracking an egg as in claim 10, wherein the planar upper surface of the platform is disposed above an upper surface of the container and an upper surface of the outer support structure.

17. An apparatus comprising:
a container;
a lid selectively coupled to the container; and
an egg cracker selectively disposed within the container, the egg cracker enclosed by the container and the lid when the lid is attached to the container and the egg cracker is disposed within the container, the egg cracker comprising:
a platform with a planar surface;
a protrusion extending upwardly from the planar surface of the platform;
a support structure sized and configured to contact the container, the support structure sized and configured to position and support the egg cracker within the container; and
one or more connecting members connecting the platform and the support structure, the one or more connecting members comprising a support wall that extends upward directly from a top of the support structure to the planar surface of the platform, wherein the support wall has at least one aperture to permit a portion of an egg that is spilled when the egg is cracked to drain through the support wall.

18. The apparatus as in claim 17, further comprising an egg separator, the egg separator selectively disposed within an opening in the container, the egg separator including a handle that facilitates use of the egg separator, the egg separator enclosed by the container and the lid when the lid is attached to the container and the egg separator is disposed within the opening in the container.

19. The apparatus as in claim 17, wherein the support structure of the egg cracker has a ring-shaped configuration that is sized and configured to be disposed within an upper portion of the container.

20. A system comprising:
a container;
a lid selectively attachable to the container;
an egg cracker selectively disposed within the container, the egg cracker comprising:
a mesa structure including a planar upper surface;
a ridge extending upwardly directly from the planar upper surface of the mesa structure, the ridge and the planar upper surface forming an egg cracking structure;
a support structure including one or more engaging portions that engage the container when the support structure is disposed in the container, the support structure including an opening; and
one or more connecting members connecting the mesa structure and the support structure, the one or more connecting members comprising a support wall that extends upward directly from a top of the support structure to the planar upper surface of the mesa structure, wherein the support wall has at least one aperture to permit a portion of an egg that is spilled when the egg is cracked to drain through the support wall; and
an egg separator selectively disposed within the opening in the support structure, the egg separator enclosed by the container and the lid when the egg separator is disposed within the opening in the support structure and the lid is attached to the container,
wherein the one or more engaging portions of the support structure comprises a circumferential lip, and
wherein the container comprises one or more circumferential protrusions engaged by the circumferential lip of the support structure.

21. The system of claim 20, wherein the support structure is sized and configured to position and support the egg separator within the container;
wherein the egg separator is selectively removable from the support structure; and
wherein the support structure is selectively removable from the container.

22. The system of claim 20, wherein the support structure has a ring-shaped configuration that is sized and configured to be disposed within an upper portion of the container.

23. The system of claim 20, wherein the egg separator includes a handle that facilitates removal of the egg separator from the support structure.

24. The system of claim 20, wherein the support structure is disposed at least proximate an upper portion of the container;
  wherein the support structure is selectively removable from the container; and
  wherein the support structure is enclosed by the container and the lid when the support structure is disposed within the container and the lid is attached to the container.

25. The egg cracker of claim 1, wherein the ridge extends substantially across a width of the mesa structure.

26. The egg cracker of claim 1, wherein the one or more connecting members extend upward directly from a top of the annular support ring to the planar upper surface of the mesa structure.

27. The egg cracker of claim 1, wherein the support wall lies on a frustoconical surface.

\* \* \* \* \*